(12) United States Patent
Cai et al.

(10) Patent No.: US 10,028,299 B2
(45) Date of Patent: Jul. 17, 2018

(54) PROVIDING A TIME OFFSET BETWEEN SCHEDULING REQUEST AND SOUNDING REFERENCE SYMBOL TRANSMISSIONS

(75) Inventors: Zhijun Cai, Euless, TX (US); James Earl Womack, Bedford, TX (US); Yi Yu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 997 days.

(21) Appl. No.: 12/052,893

(22) Filed: Mar. 21, 2008

(65) Prior Publication Data

US 2009/0238165 A1 Sep. 24, 2009

(51) Int. Cl.
*H04W 72/12* (2009.01)

(52) U.S. Cl.
CPC .... *H04W 72/1268* (2013.01); *H04W 72/1284* (2013.01)

(58) Field of Classification Search
USPC .................................................. 370/345, 329
See application file for complete search history.

(56) References Cited

U.S. PATENT DOCUMENTS

| | | | |
|---|---|---|---|
| 7,869,461 B2 | 1/2011 | Lohr et al. | |
| 2005/0002366 A1 | 1/2005 | Toskala et al. | |
| 2005/0047425 A1 | 3/2005 | Liu et al. | |
| 2005/0073985 A1 | 4/2005 | Heo et al. | |
| 2006/0035643 A1* | 2/2006 | Vook et al. | 455/450 |
| 2007/0110002 A1 | 5/2007 | Yang et al. | |
| 2007/0275728 A1 | 11/2007 | Lohr et al. | |
| 2008/0051125 A1 | 2/2008 | Muharemovic et al. | |
| 2008/0080472 A1* | 4/2008 | Bertrand | H04J 11/005 370/344 |
| 2008/0101306 A1* | 5/2008 | Bertrand | H04L 27/2613 370/336 |
| 2009/0109908 A1* | 4/2009 | Bertrand | H04L 5/0051 370/329 |
| 2009/0238121 A1* | 9/2009 | Kotecha | H04L 1/0026 370/329 |
| 2009/0239568 A1* | 9/2009 | Bertrand | H04W 52/0225 455/522 |
| 2009/0316811 A1* | 12/2009 | Maeda | H04W 76/11 375/260 |

(Continued)

FOREIGN PATENT DOCUMENTS

| | | |
|---|---|---|
| EP | 1858210 A1 | 11/2007 |
| KR | 20060016427 A | 2/2006 |

(Continued)

OTHER PUBLICATIONS

3GPP TS 36.321 V8.2.0; 3rd Generation Partnership Project; Technical Specification Group Radio Access Network; Evolved Universal Terrestrial Radio Access (E-UTRA) Medium Access Control (MAC) Protocol Specification; Release 8; May 2008; 33 pgs.

(Continued)

*Primary Examiner* — Gregory Sefcheck
*Assistant Examiner* — Majid Esmaeilian
(74) *Attorney, Agent, or Firm* — Conley Rose, P.C.; J. Robert Brown, Jr.

(57) ABSTRACT

A user equipment (UE) including a processor configured to promote scheduling transmission of a series of scheduling requests offset a series of sounding reference symbols.

12 Claims, 7 Drawing Sheets

(56) References Cited

U.S. PATENT DOCUMENTS

2010/0202420 A1\* 8/2010 Jersenius ................ H04L 47/10
370/337

FOREIGN PATENT DOCUMENTS

| WO | 2003051007 | A1 | 6/2003 |
|---|---|---|---|
| WO | 2006019267 | A1 | 2/2006 |
| WO | 2007059201 | A2 | 5/2007 |

OTHER PUBLICATIONS

Cai, Zhijun, et al.; U.S. Appl. No. 12/023,897, filed Jan. 31, 2008; Title: "Method and Apparatus for Allocation of an Uplink Resource".

European Search and Examination Report; Application No. 08153860.5; dated Jan. 27, 2011; 5 pgs.

3GPP TSG RAN WG1 #52; Sounding Reference Signal in Support of Scheduling Request in E-UTRA; R1080700; Texas Instruments; Sorrento, Italy; Feb. 11-15, 2008; 7 pgs.

LG Electronics, Inc.; 3GPP TSG RAN WG1 #51; Title: "Scheduling Request (SR) Interaction with PUCCH"; R1-074739; Jeju, Korea; Nov. 5-9, 2007; 5 pgs.

NTT DoCoMo, KDDI, Sharp; 3GPP TSG RAN WG1 Meeting #51; Title: Multiplexing Scheme for Sounding RS in E-UTRA Uplink; R1-074808; Jeju, Korea; Nov. 5-9, 2007; 3 pgs.

Ghosh, Amitava, et al.; Title: "Uplink Control Channel Design for 3GPP LTE"; IEEE international Symposium; Sep. 1, 2007; 5 pgs.

European Search and Examination Report; EP Application No. 08153860; dated Jun. 18, 2008; 9 pgs.

3GPP TS 36.321 v8.1.0; 3rd Generation Partnership Project; Technical Specification Group Radio Access Network; Title: Evolved Universal Terrestrial Radio Access (E-UTRA) Medium Access Control (MAC) Protocol Specification; Release 8; Mar. 2008; 30 pgs.

European Extended Search Report; EP Application No. 08153672.4; dated Feb. 25, 2009; 9 pgs.

Partial European Search Report; EP Application No. 08153672.4; dated Jul. 17, 2008; 4 pgs.

PCT International Search Report; PCT Application No. PCT/US2009/032436; dated Sep. 14, 2009; 4 pgs.

PCT Written Opinion of the International Searching Authority; PCT Application No. PCT/US2009/032436; dated Sep. 14, 2009; 6 pgs.

PCT International Preliminary Report on Patentability; PCT Application No. PCT/US2009/032436; dated May 24, 2010; 6 pgs.

Office Action dated Mar. 30, 2011; U.S. Appl. No. 12/023,897, filed Jan. 31, 2008; 16 pages.

European Extended Search Report; Application No. 11183791.0; dated Oct. 25, 2011; 5 pages.

Notice of Allowance dated Aug. 16, 2011; U.S. Appl. No. 12/023,897, filed Jan. 31, 2008; 8 pages.

European Examination Report; EP Application No. 08153672.4; dated Aug. 9, 2011; 4 pages.

European Extended Search Report; Application No. 11155712.0; dated Mar. 13, 2012; 10 pages.

European Examination Report; Application No. 08153860.5; dated Mar. 9, 2017; 6 pages.

European Examination Report; Application No. 08153860.5; dated Nov. 13, 2014; 4 pages.

Canadian Office Action; Application No. 2,713,774; dated May 5, 2014; 2 pages.

European Examination Report; Application No. 11155712.0; dated Dec. 17, 2015; 5 pages.

\* cited by examiner

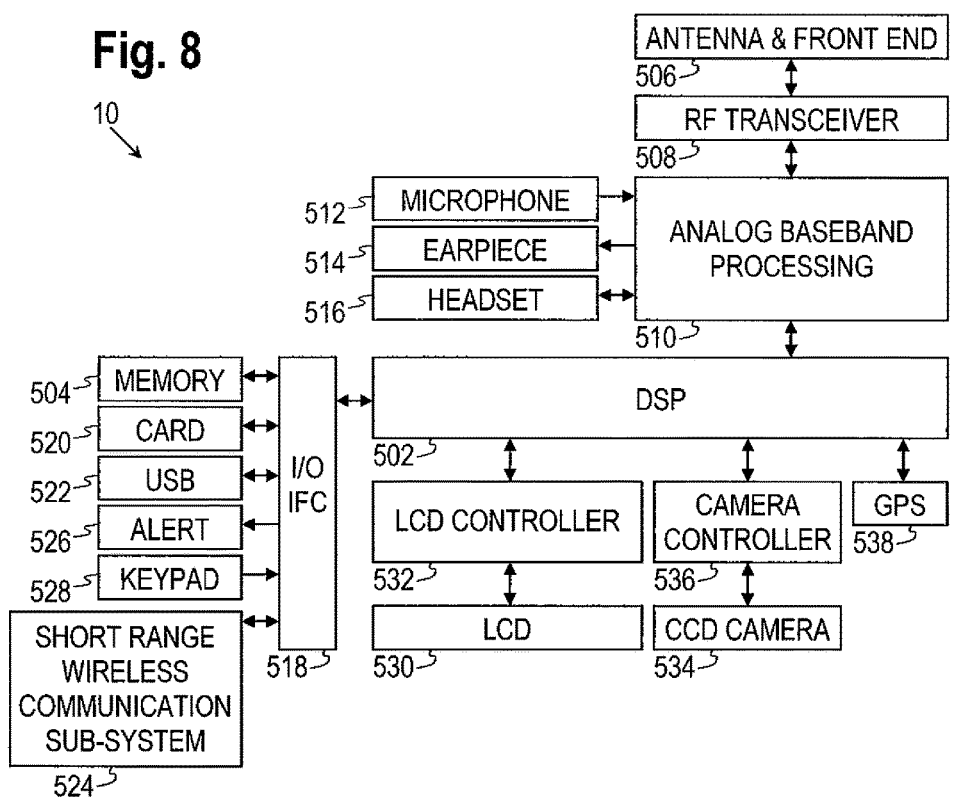
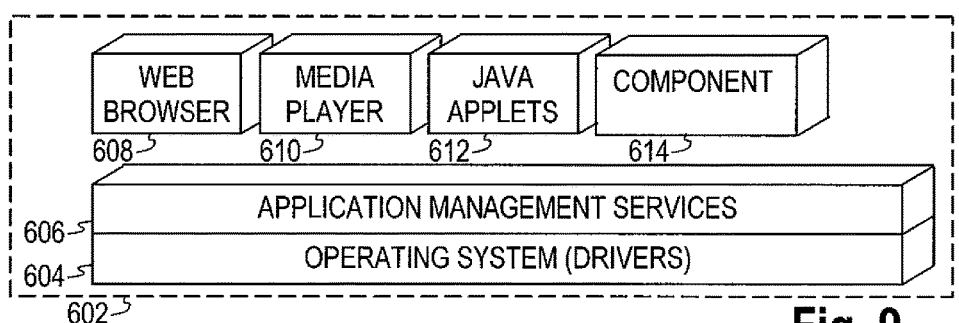

US 10,028,299 B2

PROVIDING A TIME OFFSET BETWEEN SCHEDULING REQUEST AND SOUNDING REFERENCE SYMBOL TRANSMISSIONS

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

A signal that carries data between a UE and an ENB can have a specific set of frequency, code, and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a block diagram of a user equipment operable for some of the various embodiments of the disclosure.

FIG. 9 is a diagram of a software environment that may be implemented on a user equipment operable for some of the various embodiments of the disclosure.

DETAILED DESCRIPTION

Figure 1:
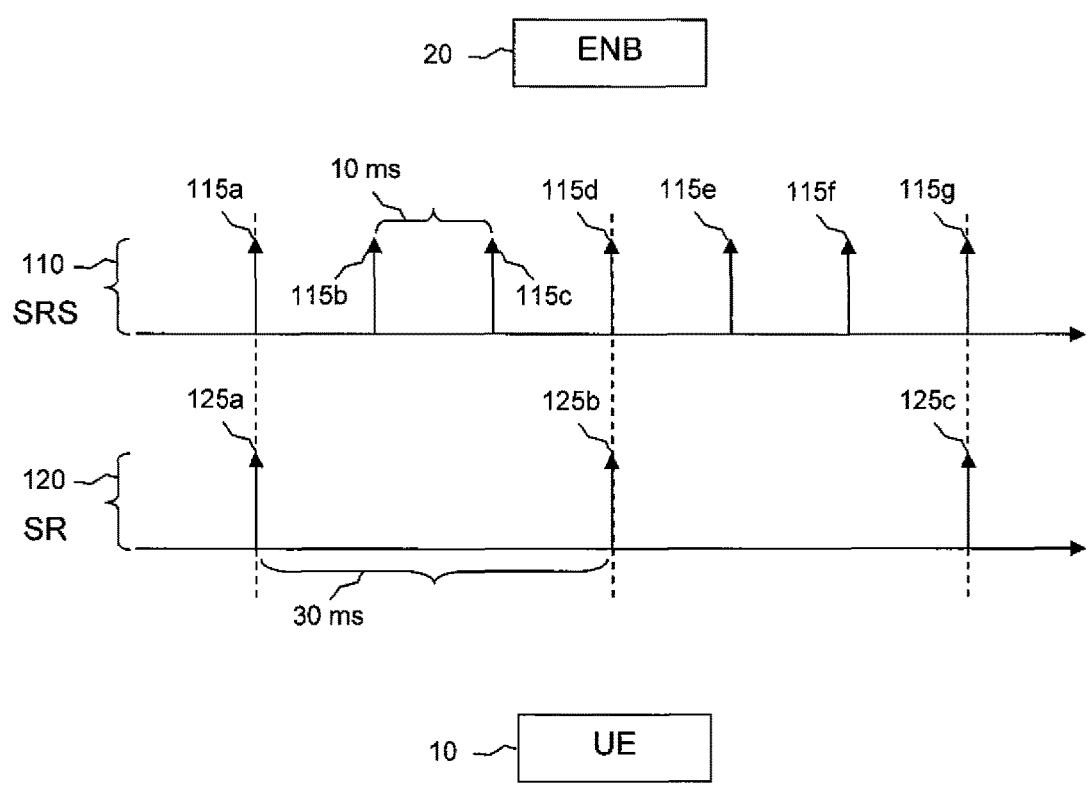
FIG. 1 is a diagram illustrating an SR transmission and an SRS transmission.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment (UE) is provided that includes a processor configured to promote scheduling transmission of a series of scheduling requests offset a series of sounding reference symbols.

In another embodiment, a method is provided for a user equipment to transmit a series of periodic scheduling requests and a series of periodic sounding reference symbols. The method includes transmitting one of either the series of periodic scheduling requests or the series of periodic sounding reference symbols. The method includes offset transmitting the other of the series of periodic scheduling requests or the series of periodic sounding reference symbols.

In another embodiment, a component in a telecommunications network is provided. The component includes a processor configured to promote assigning a first resource for a series of periodic scheduling requests and assigning a second resource for a series of periodic sounding reference symbols scheduled to promote a user equipment transmitting the series of periodic scheduling requests and series of periodic sounding reference symbols offset to one another.

In one embodiment, a method is provided that includes assigning a first resource for a series of periodic scheduling requests, and assigning a second resource for a series of periodic sounding reference symbols scheduled. The first and second resource assigned to promote a user equipment (UE) transmitting the series of periodic scheduling requests and series of periodic sounding reference symbols offset to one another.

A four-step process might be followed in allocating an uplink resource to a UE so that the UE can transmit data to an ENB. In the first step, the UE sends a scheduling request (SR) to the ENB over an SR channel. The SR channel is a dedicated channel between the UE and the ENB that is traditionally established specifically for the purpose of providing the UE a channel for requesting resources from the ENB. In the second step, upon receiving the SR from the UE, the ENB assigns the UE a minimal amount of resource capacity. In the third step, the UE uses this limited resource capacity to send the ENB a buffer status report that informs the ENB of the quantity of data the UE wishes to send as well as other information such as QoS (Quality of Service) information. The ENB uses this information to determine the quantity of resource capacity the UE will need for the data the UE wishes to send. In the fourth step, the ENB allocates to the UE the amount of resource capacity appropriate for the data quantity and any QoS requirements or other considerations specified in the buffer status report. This resource capacity is then allocated for subsequent data packets that the UE transmits to the ENB.

To allow the UE have the capability to quickly request the uplink resource for the uplink transmission without any contentions, a periodical dedicated resource is allocated to the UE to transmit the scheduling request indicator (for example, every 20 ms). Whenever the UE has the buffered data to be transmitted on the uplink, UE should send the scheduling request indicator to the eNB.

A sounding reference symbol (SRS) is a reference tone (or reference symbol) that can be transmitted in an uplink from the UE to the ENB. The ENB measures the SRS to estimate the quality of the uplink channel so that uplink data transmissions can use a suitable modulation and coding scheme. Like the SR, the SRS might be transmitted from the UE to the ENB at periodic intervals.

The ENB assigns the UE different resources for the SR transmissions and the SRS transmissions, and the UE then transmits the SR on one of the resources and the SRS on the other resource. However, due to physical layer limitations, if the two transmissions happen to occur in the same sub-frame, the quality of the transmissions may be inadequate. To prevent unacceptable quality in an SR transmission, it has been proposed that if an SR transmission and an SRS transmission occur in the same sub-frame, the SRS transmission should be dropped.

This is illustrated in FIG. 1, where an SRS resource 110 includes a series of periodic SRS transmissions 115 from a UE 10 to an ENB 20. In this example, the SRS transmissions 115 occur every 10 milliseconds, but other transmission periods could be used. Also shown is an SR resource 120 that includes a series of periodic SR transmissions 125 from the UE 10 to the ENB 20. The SR transmissions 125 have a period of 30 milliseconds in this example, but could have a different period. Since the period of the SR transmissions 125 is an exact multiple of the period of the SRS transmissions 115, and since the SRS transmissions 115 and the SR transmissions 125 begin at the same time, the two transmissions can periodically occur at substantially the same time. More specifically, in this example, every third SRS transmission 115 coincides with one of the SR transmissions 125, as indicated by the dashed lines. The overlapping SRS transmissions 115, namely SRS transmission 115a, SRS transmission 115d, and SRS transmission 115g, would be dropped under the current proposals.

However, dropping an SRS transmission could prevent the ENB 20 from making a valid estimate of the uplink channel quality, which could lead to the use of a modulation and coding scheme that is more conservative or more aggressive than is appropriate. In an embodiment, an offset is introduced between the transmission times of a series of SR transmissions and a series of SRS transmissions to reduce, and in some cases eliminate, the possibility that an SR transmission and an SRS transmission will occur in the same sub-frame. That is, the ENB 20 assigns the SRS resource 110 and the SR resource 120 in such a manner that when the first transmission occurs on one of the resources, a short delay occurs before a transmission occurs on the other resource. Subsequent transmissions then occur on both resources with the periods the transmissions would otherwise have had. This causes the same offset to be present between the transmissions and can prevent an SRS transmission and an SR transmission from occurring in the same sub-frame. This, in turn, can prevent the dropping of an SRS transmission and allow both transmissions to occur with sufficient quality. In some embodiments, the time offset is applied to the SR transmissions and in other embodiments the offset is applied to the SRS transmissions. As an example, the offset might be approximately 1 millisecond.

Such an offset could be applied in four different situations. In a general case, there is no regular relationship between the period of the SR transmissions and the period of the SRS transmissions. In three special cases, the period of one of the transmissions is a whole multiple of the period of the other transmission. The first of these special cases is similar to the scenario of FIG. 1, where the period of the SR transmissions 125 is a whole multiple of the period of the SRS transmissions 115. In a second special case, the period of the SRS transmissions is a whole multiple of the period of the SR transmissions. In a third special case, the periods of the SRS transmissions and the SR transmissions are equal.

Figure 2:
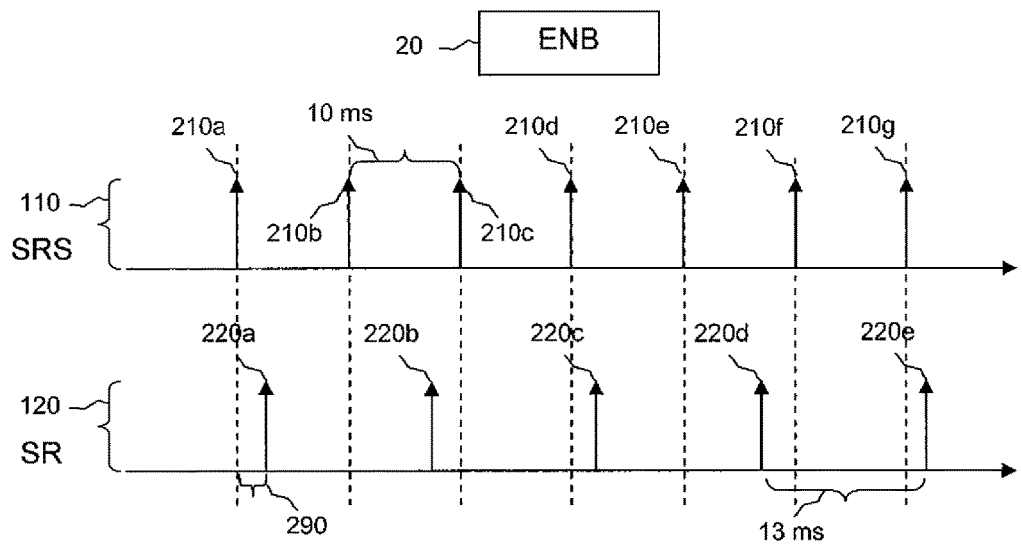
FIG. 2 is a diagram illustrating an offset between an SR transmission and an SRS transmission according to an embodiment of the disclosure.

FIG. 2 illustrates an embodiment where the SR and the SRS are not transmitted with frequencies where the period of one set of transmissions is a whole multiple of the other. In this example, the SRS resource 110 might include a series of SRS transmissions 210 that have a period of 10 milliseconds, and the SR resource 120 might include a series of SR transmissions 220 that have a period of 13 milliseconds. In other cases, the transmissions could have other non-multiple periods.

In an embodiment, a small offset 290 is introduced into the transmission times of the SR transmissions 220. That is, the first SR transmission 220a begins a short time after the first SRS transmission 210a. Thereafter, the SRS transmissions 210 and the SR transmissions 220 continue with their usual periods of 10 milliseconds and 13 milliseconds, respectively. In other embodiments, the offset 290 could be applied to the transmission times of the SRS transmissions 210 rather than the SR transmissions 220. Dashed lines indicate the times when the SRS transmissions 210 occur. It can be seen that none of the SR transmissions 220 overlap with the SRS transmissions 210 in this case. Therefore, none of the SRS transmissions 210 will be dropped.

The offset 290 can reduce the likelihood that the SRS transmissions 210 and the SR transmissions 220 will occur in the same sub-frame. However, in this general case, overlaps could still occur for certain combinations of SRS periods, SR periods, and sizes of the offset 290. For example, if the SRS transmissions 210 have a period of 20 milliseconds, the SR transmissions 220 have a period of 30 milliseconds, and the offset 290 is 10 milliseconds, an overlap between the SRS transmissions 210 and the SR transmissions 220 will occur every 60 milliseconds.

Figure 3:
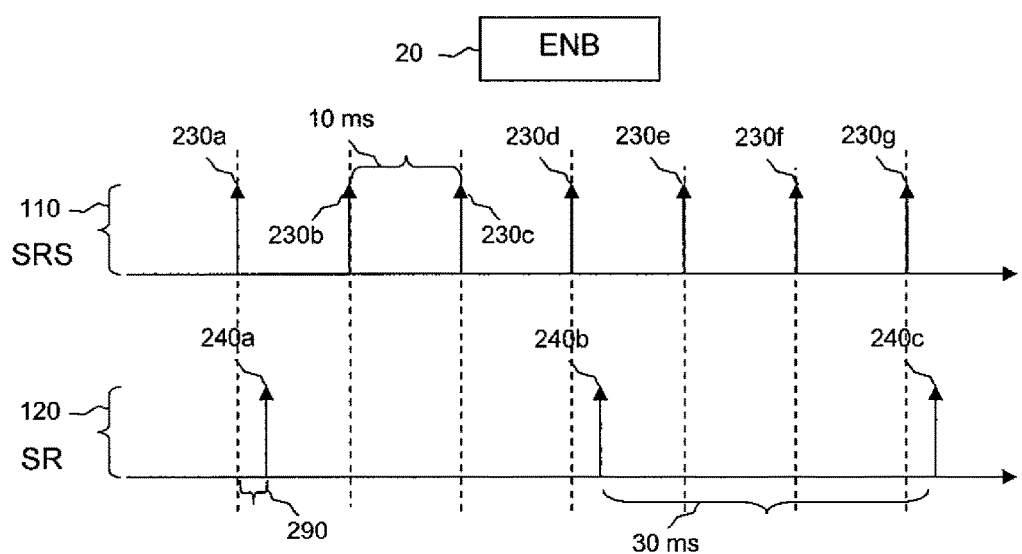
FIG. 3 is a diagram illustrating an offset between an SR transmission and an SRS transmission according to another embodiment of the disclosure.

For the three special cases where one of the periods is a whole multiple of the other, the size of the offset 290 can be chosen such that overlaps do not occur. One of these special cases is illustrated in FIG. 3, where the period of a series of SR transmissions 240 is a whole multiple of the period of a series of SRS transmissions 230. In this example, the SRS transmissions 230 have a period of 10 milliseconds and the SR transmissions 240 have a period of 30 milliseconds. An instance of the offset 290 has been introduced into the SR transmissions 240 in this example. In other embodiments, the offset 290 could be placed in the SRS transmissions 230.

After the offset 290 is applied, the SR transmissions 240 continue with a period of 30 milliseconds, causing the same offset 290 to be applied to the subsequent SR transmissions 240. Dashed lines indicate the times when the SRS transmissions 230 occur and when the SR transmissions 240 might have occurred if the SR transmissions 240 did not have the offset 290. It can be seen that with an appropriate choice for the size of the offset 290, the SRS transmissions 230 and the SR transmissions 240 will never overlap. For example, as long as the size of the offset 290 is not a whole multiple of the period of the SRS transmissions 230, the SRS transmissions 230 and the SR transmissions 240 will not coincide and no SRS transmissions 230 will be dropped.

Figure 4:
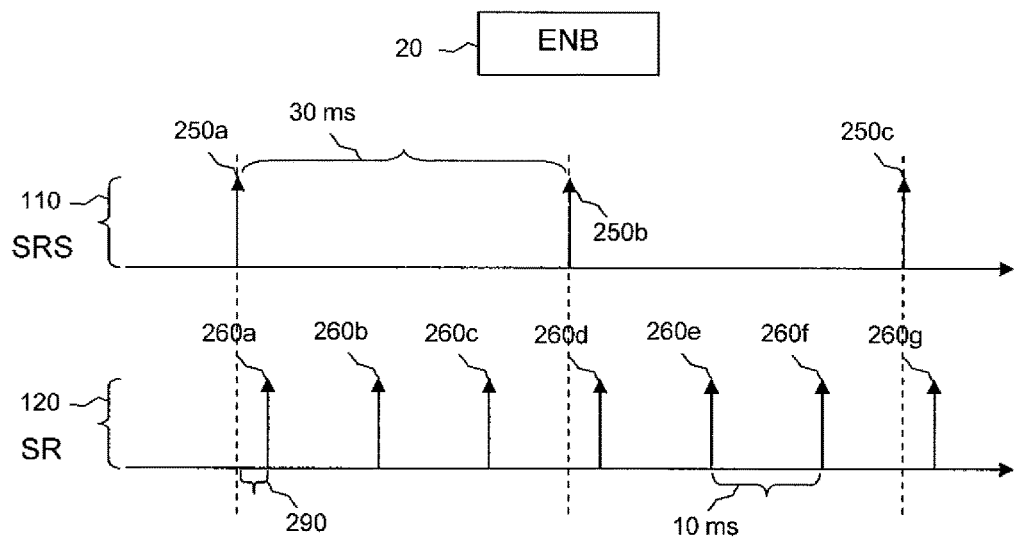
FIG. 4 is a diagram illustrating an offset between an SR transmission and an SRS transmission according to another embodiment of the disclosure.

Another of the special cases is illustrated in FIG. 4. In this case, the period of a series of SRS transmissions 250 is a whole multiple of the period of a series of SR transmissions 260. An instance of the offset 290 has been applied to the SR transmissions 260 in this example, but in other embodiments, the offset 290 could be placed in the SRS transmissions 250. Dashed lines again indicate the times when the SRS transmissions 250 occur and when the SR transmissions 260 might have occurred without the offset 290. An appropriate size of the offset 290 can again ensure that the SRS transmissions 250 and the SR transmissions 260 will not coincide.

Figure 5:
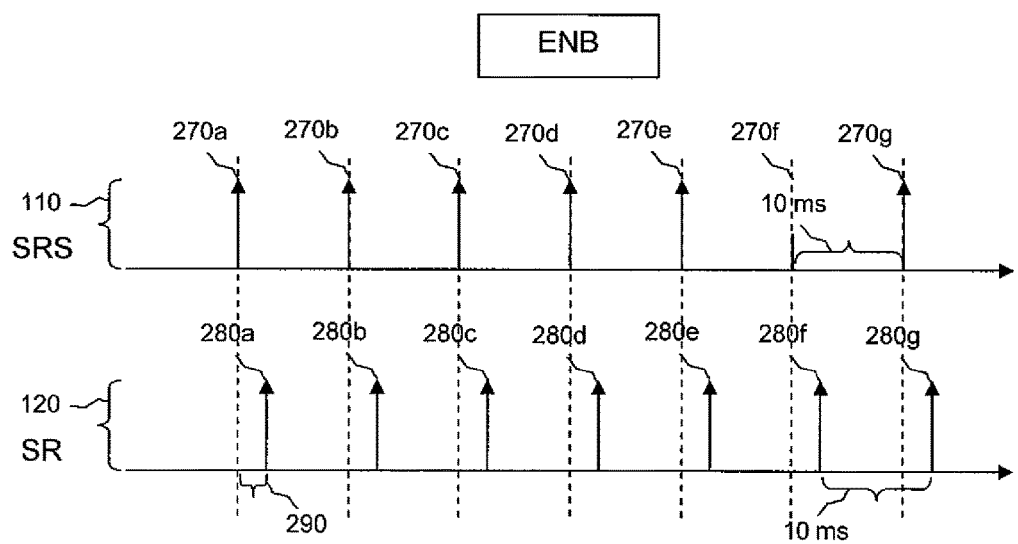
FIG. 5 is a diagram illustrating an offset between an SR transmission and an SRS transmission according to another embodiment of the disclosure.

The third of the special cases is illustrated in FIG. 5. In this case, the period of a series of SRS transmissions 270 is equal to the period of a series of SR transmissions 280. An instance of the offset 290 has been applied to the SR transmissions 280 in this example, but in other embodiments, the offset 290 could be applied to the SRS transmissions 270. Dashed lines indicate the times when the SRS transmissions 270 occur and when the SR transmissions 280 would have occurred without the offset 290. With an appropriate size of the offset 290, the SRS transmissions 270 and the SR transmissions 280 will again not coincide.

Figure 6A:
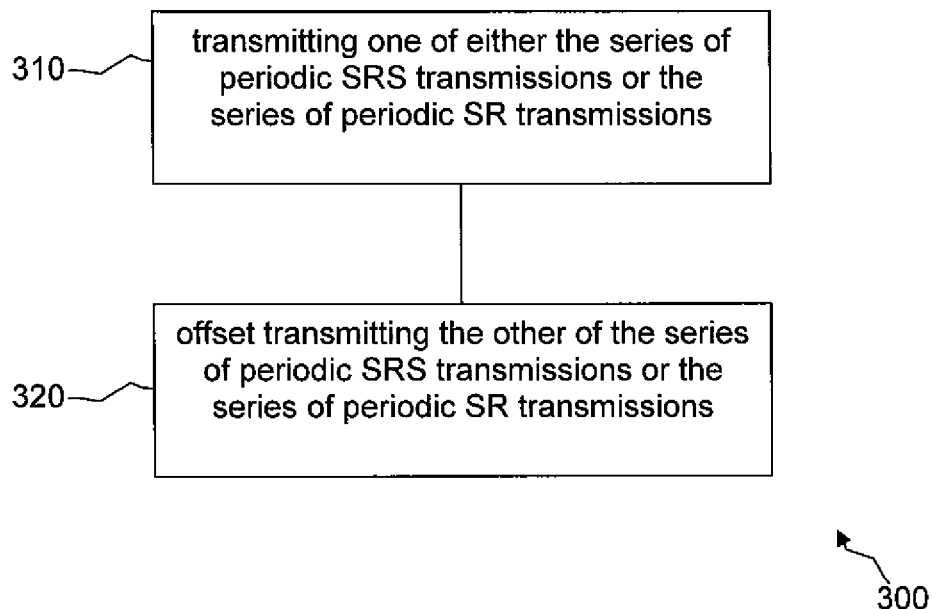
FIG. 6A is a block diagram of a method for transmitting a series of periodic scheduling requests and a series of periodic sounding reference symbols according to an embodiment of the disclosure.

FIG. 6A illustrates an embodiment of a method 300 for transmitting a series of periodic scheduling requests and a series of periodic sounding reference symbols. In block 310, the method provides for transmitting one of either the series of periodic scheduling requests or the series of periodic sounding reference symbols. In block 320, the method includes offset transmitting the other of the series of periodic scheduling requests or the series of periodic sounding reference symbols.

Figure 6B:
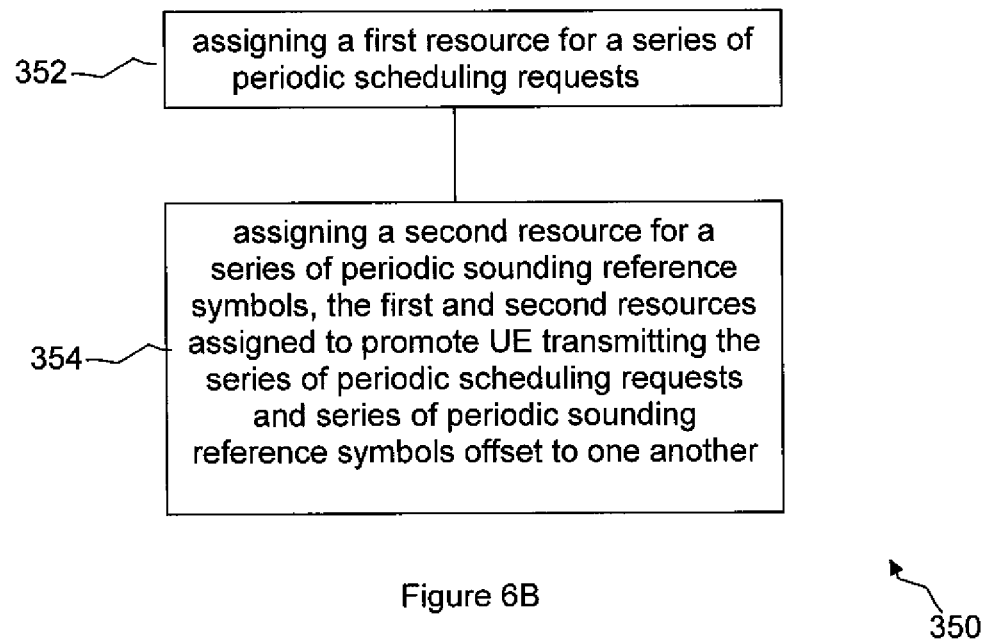
FIG. 6B is a block diagram of a method for assigning resources to promote transmitting a series of periodic scheduling requests and a series of periodic sounding reference symbols according to an embodiment of the disclosure

FIG. 6B illustrates another method 350 for assigning resources. The method includes, in block 352, assigning a first resource for a series of periodic scheduling requests. In block 354, the method provides for assigning a second resource for a series of periodic sounding reference symbols. The first and second resources assigned to promote a user equipment (UE) transmitting the series of periodic scheduling requests and series of periodic sounding reference symbols offset to one another.

Figure 7:
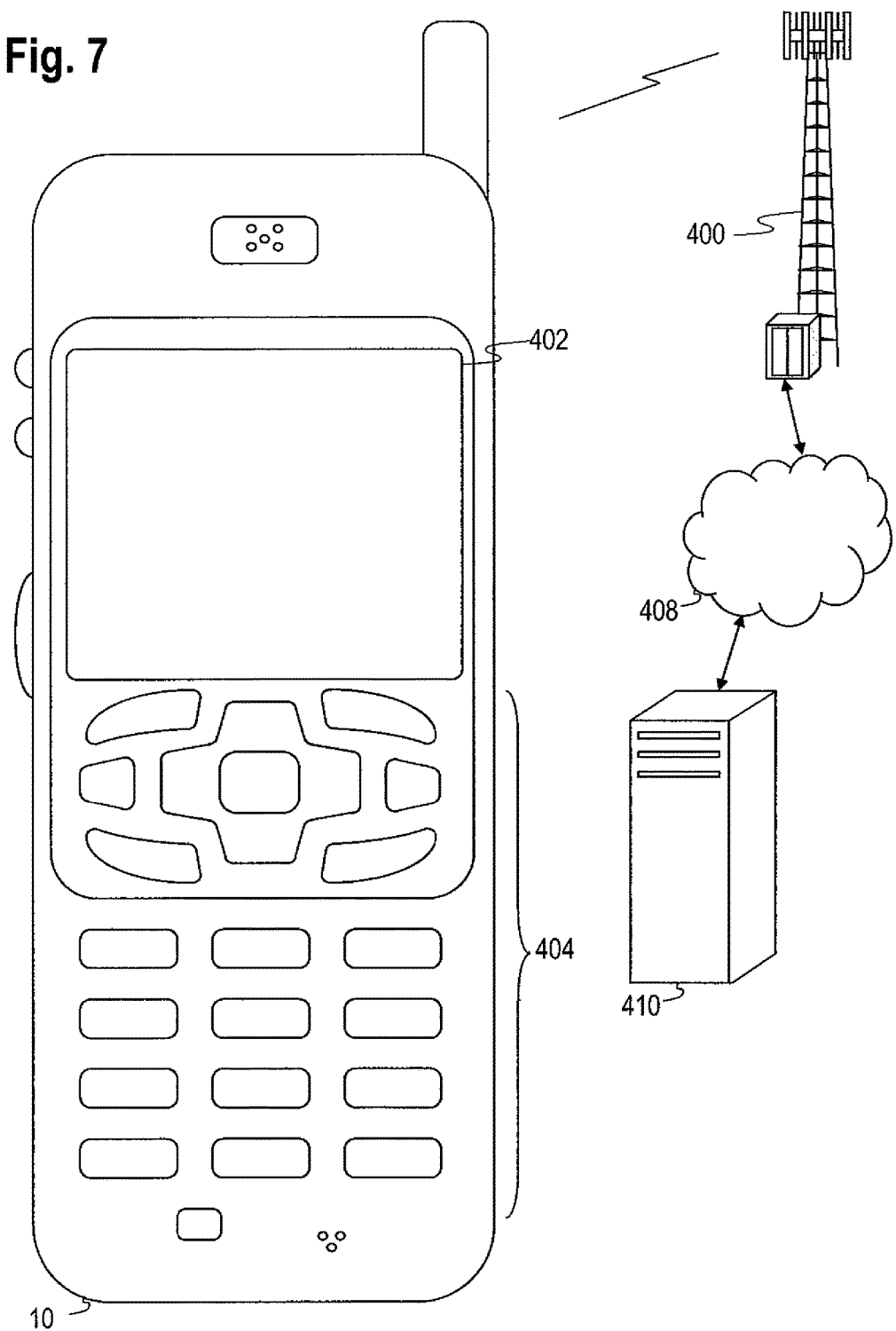
FIG. 7 is a diagram of a wireless communications system including a user equipment operable for some of the various embodiments of the disclosure.

FIG. 7 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

FIG. 8 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

FIG. 9 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 9 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might perform functions related to time offsets between SR and SRS transmissions.

Figure 10:
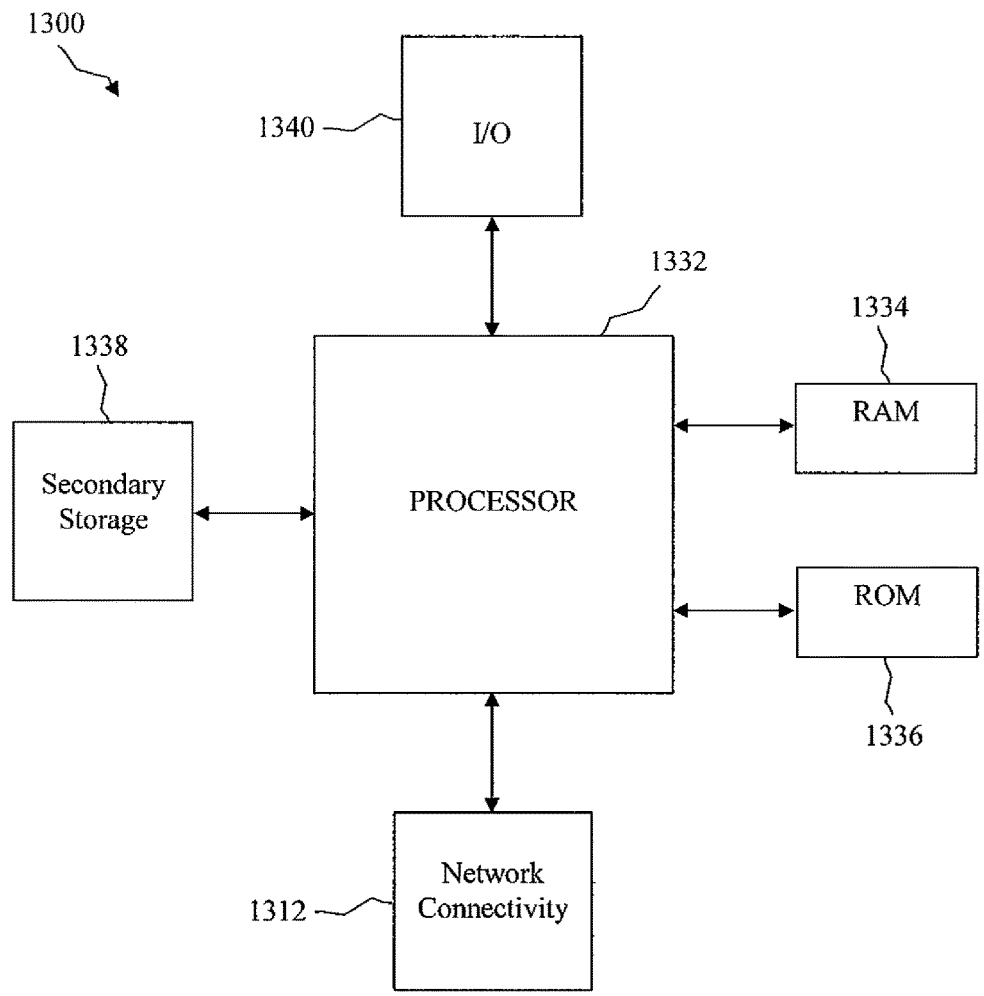
FIG. 10 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. Such information, which is often represented as a sequence of instructions to be executed using the processor 1332, may be received from and outputted to the network, for example, in the form of a computer data signal embodied in a carrier wave. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

The following are incorporated herein by reference for all purposes: $3^{rd}$ Generation Partnership Project (3GPP) Technical Specification (TS) 36.300, 3GPP TS 36.321.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus in a telecommunications network, comprising:
a processor configured to:
assign a first uplink resource to be used by a user equipment (UE) to transmit a series of periodic scheduling requests to the apparatus,
assign a second uplink resource to be used by the UE to transmit a series of sounding reference symbols to the apparatus,
determine a first period for the UE to periodically transmit scheduling requests,
determine a second period for the UE to periodically transmit sounding reference symbols, wherein the first period of scheduling request (SR) transmissions is an integer multiple of the second period of sounding reference symbol (SRS) transmissions,
determine a first start time and a second start time for the UE to begin the first period of SR transmissions and the second period of SRS transmissions, respectively,
select a time offset between the first start time and the second start time, wherein the time offset is not an integer multiple of the second period, wherein the processor configures the time offset in assigning the first and the second uplink resources such that the first period of SR transmissions and the second period of SRS transmissions periodically recur without overlapping in time with one another,
signal to the UE resource parameters associated with the assigned uplink resources and timing parameters associated with the determined periods and selected time offset, and
receive from the UE the series of scheduling requests and the series of sounding reference symbols at non-overlapping intervals.

2. The apparatus of claim 1, wherein the second period of SRS transmissions is equal to a fixed duration.

3. The apparatus of claim 1, wherein the apparatus assigns the first uplink resource such that scheduling requests in the series of SR transmissions are transmitted by the UE whenever the UE has buffered data to transmit.

4. The apparatus of claim 1, wherein the apparatus assigns the second uplink resource such that sounding reference symbols in the series of SRS transmissions are transmitted by the UE irrespective of whether the UE has buffered data to transmit during the non-overlapping intervals.

5. The apparatus of claim 1, wherein the apparatus comprises an enhanced node B.

6. A method comprising:
assigning, by an apparatus in a wireless communication network, a first uplink resource to be used by a user equipment (UE) to transmit a series of scheduling requests to the apparatus;
assigning, by the apparatus, a second uplink resource to be used by the UE to transmit a series of sounding reference symbols to the apparatus;
determining a first period for the UE to periodically transmit scheduling requests;
determining a second period for the UE to periodically transmit sounding reference symbols, wherein the first period of scheduling request (SR) transmissions is an integer multiple of the second period of sounding reference symbol (SRS) transmissions;
determining a first start time and a second start time for the UE to begin the first period of SR transmissions and the second period of SRS transmissions, respectively;
selecting a time offset between the first start time and the second start time, wherein the time offset is not an integer multiple of the second period, wherein the apparatus configures the time offset in assigning the first and second uplink resources such that the first period of SR transmissions and the second period of SRS transmissions periodically recur without overlapping in time with one another; and
receiving, by the apparatus, the series of scheduling requests and the series of sounding reference symbols at non-overlapping intervals.

7. The method of claim 6, further comprising preventing the UE from transmitting an uplink SR and an uplink SRS in a same subframe by applying the time offset between the series of SR transmissions and the series of uplink SRS transmissions such that SR transmission instances never overlap in time with uplink SRS transmission instances.

8. The method of claim 6, wherein the apparatus assigns the first uplink resource such that scheduling requests in the series of SR transmissions are transmitted by the UE whenever the UE has buffered data to transmit.

9. The method of claim 6, wherein the apparatus assigns the second uplink resource such that sounding reference symbols in the series of SRS transmissions are transmitted by the UE at periodic intervals irrespective of whether the UE has buffered data to transmit during the periodic intervals.

10. A non-transitory computer medium storing computer readable instructions executable by a processor to implement a method by an apparatus in a wireless communication network, the method comprising:
assigning a first uplink resource to be used by a user equipment (UE) to transmit a series of scheduling requests to the apparatus;
assigning a second uplink resource to be used by the UE to transmit a series of sounding reference symbols to the apparatus;
determining a first period for the UE to periodically transmit scheduling requests;
determining a second period for the UE to periodically transmit sounding reference symbols, wherein the first period of scheduling request (SR) transmissions is an integer multiple of the second period of sounding reference symbol (SRS) transmissions;
determining a first start time and a second start time for the UE to begin the first period of SR transmissions and the second period of SRS transmissions, respectively;
selecting a time offset between the first start time and the second start time, wherein the time offset is not an integer multiple of the second period, wherein the apparatus configures the time offset in assigning the first and second uplink resources such that the first period of SR transmissions and the second period of SRS transmissions periodically recur without overlapping in time with one another; and
receiving, by the apparatus, the series of scheduling requests and the series of sounding reference symbols at non-overlapping intervals.

11. The non-transitory computer medium of claim 10, wherein the apparatus assigns the first uplink resource such that scheduling requests in the series of SR transmissions are transmitted by the UE whenever the UE has buffered data to transmit.

12. The non-transitory computer medium of claim 10, wherein the apparatus assigns the second uplink resource such that sounding reference symbols in the series of SRS transmissions are transmitted by the UE at periodic intervals irrespective of whether the UE has buffered data to transmit during the periodic intervals.

* * * * *